July 24, 1956  A. GALBRAITH ET AL  2,755,729
VENTILATION DEVICES OR LOUVERS
Filed Feb. 18, 1953  4 Sheets-Sheet 1

Inventors
Alexander Galbraith
John Cleiff
By *Lancaster, Allwine & Rommel*
Attorneys July 24, 1956  A. GALBRAITH ET AL  2,755,729
VENTILATION DEVICES OR LOUVERS
Filed Feb. 18, 1953  4 Sheets-Sheet 2
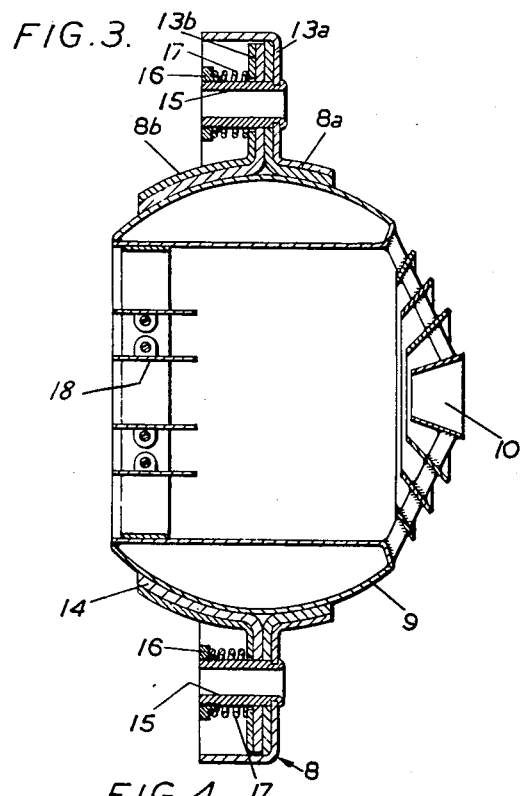
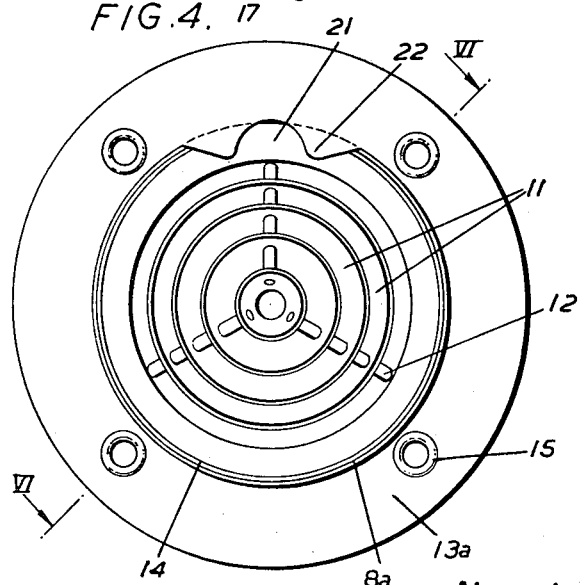
Inventors
Alexander Galbraith
John Cleiff
By Lancaster, Allwine & Rommel
Attorneys July 24, 1956 A. GALBRAITH ET AL 2,755,729
VENTILATION DEVICES OR LOUVERS
Filed Feb. 18, 1953 4 Sheets-Sheet 3

Inventors
Alexander Galbraith
John Cleiff

Attorneys

July 24, 1956 A. GALBRAITH ET AL 2,755,729
VENTILATION DEVICES OR LOUVERS
Filed Feb. 18, 1953 4 Sheets-Sheet 4

Inventors
Alexander Galbraith
John Cleiff
By Lancaster, Allwine & Rommel
Attorneys United States Patent Office 2,755,729
Patented July 24, 1956

2,755,729

VENTILATION DEVICES OR LOUVERS

Alexander Galbraith, Glasgow, and John Cleiff, Larkhall, Scotland, assignors of one-half to Scottish Aluminium Ware Limited, Larkhall, Great Britain Application February 18, 1953, Serial No. 337,618

4 Claims. (Cl. 98—40)

This invention relates to directionally adjustable ventilation devices or louvres of the type comprising inner and outer complementary parts, the inner being mounted in the outer so as to be capable of swivelling movement in order to vary the direction of the ventilating air stream. Such devices are commonly made on the ball and socket principle so as to allow universal direction of the issuing air. In other cases the inner part may swivel in one plane but may be carried by an intermediate mounting carried by the outer part thereby giving two components of movement about axes mutually at right angles thereby to give universal movement.

For many years one of the great inherent disadvantages of this type of ventilating device or louvre has been the fact that when it is mounted at locations where vibration occurs, for example in trains or ships, the vibration set up causes the inner part to creep relative to the outer part so that it gradually moves away from the position at which it has been set, and thereby does not direct the issuing air in the desired direction and possibly alters the rate of flow of the issuing air. The inner parts are often cushioned from the outer parts by means of a felt sleeve. This allows easy relative adjustment of the parts. However, in this case the tendency of the parts to creep relative to one another increases after prolonged use, due to the felt sleeve wearing thin or being compressed. This disadvantage reaches major proportions when the ventilating device or louvre is mounted at locations subject to very severe vibrations, such as in military tanks, aircraft and the like.

An object of the present invention is to obviate or mitigate the above disadvantage.

In accordance with the present invention, we provide a directionally adjustable ventilation device comprising inner and outer complementary parts constructed and arranged to permit adjustment of the inner part relative to the outer part, in combination with means for resiliently urging the two parts together in order to obviate or mitigate creep of the inner part relative to the outer part.

Preferably said outer part comprises a pair of opposed similar components and means resiliently urging the components towards each other to grip the inner part in its set position relative to the other part.

Various embodiments of the invention will now be described, by way of example, with reference to the accompanying drawings which illustrate devices of the ball and socket type allowing swivelling of the ball within the socket through 180°, thus enabling, as well as directional adjustment, also, at choice, either a direct relatively high velocity ventilating air flow or a relatively low velocity diffused air flow. This type of device is particularly suitable for use in military tanks, aircraft and the like which are liable to be moved from locations with hot climates to locations with cold climates, or vice versa, at short notice.

In the drawings:

Fig. 3 is a view in section on the line III—III of Fig. 1;

Figs. 4 and 5 are respectively front and rear elevations of a second directionally adjustable ventilation device or louvre in accordance with the invention;

Throughout the specification, similar parts in the various embodiments are referred to by the same reference numerals.

Figure 1:
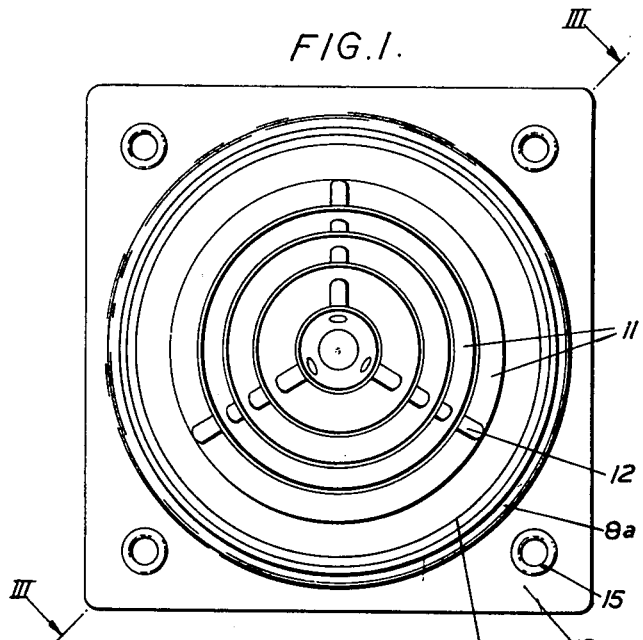
Figs. 1 and 2 are respectively front and rear elevations of a directionally adjustable ventilation device or louvre in accordance with the invention.
Figure 2:
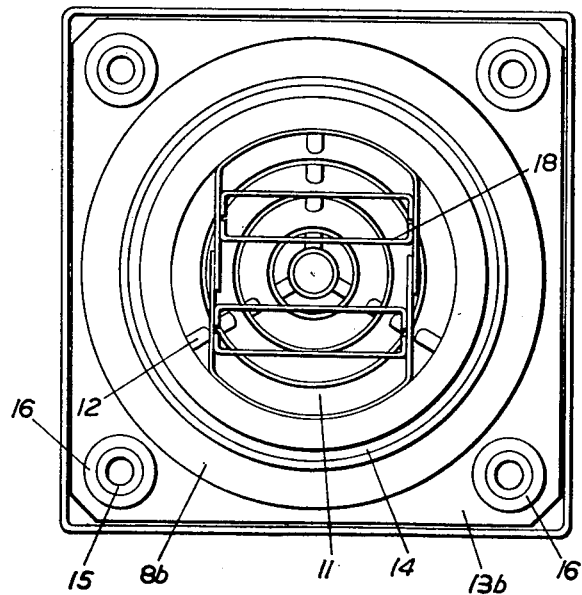

The device (see Figs. 1 to 3) comprises an outer part-sphere 8 which mounts an inner hollow substantially spherically part 9, the inner part 9 having one pole completely cut away and at the other pole a diffuser 10 comprising a series of concentrically outwardly diverging cones 11 interconnected by means of a spider 12 and located within the bounding surface of the sphere 8.

The outer spherical part 8 comprises two components 8a, 8b, which are complementary, each being part-spherical, and each of which is provided with a peripheral flange 13a, 13b respectively, the two flanges being disposed in spaced confronting relation and joined together in opposed location by pins or the like which allow relative movement of the components 8a, 8b towards or away from each other. Coil springs or rubber or any other resilient devices are mounted on said pins so as resiliently to urge the two components towards each other, while a felt lining 14 is provided between the part-spherical components 8a and 8b and the inner hollow spherical part 9, and between the peripherial flanges 13a and 13b.

In this embodiment four hollow rivets or sleeves 15 are passed through the two flanges 13a, 13b, and at the rear end the sleeves 15 are provided with adjustable thrust nuts 16, coil springs 17 being provided between the nuts 16 and the rear face of the rear flange 13b. The sleeves or rivets 15 are thus spring-loaded.

By gripping the ball 9 at its outer surface it may be turned universally relative to the socket 8 to direct the outflowing air, while either a direct high velocity blow or a diffused supply may be obtained by turning the ball through 180°.

When the device is mounted on a ventilation trunking, the air flow along said trunking is normal to that required from the device when in its central position. Thus the air tends to issue from the device slightly offset from the required direction and towards the original direction of flow in the trunking. Thus adjustable equalizing deflectors or baffles 18 may be provided to deflect the air flow axially through the device.

The provision of the springs 17 resiliently to urge the parts 8a, 8b toward each other substantially ensures that the ball 9 is held locked in its set position by said parts 8a, 8b, although the latter are able to move apart readily when necessary to allow easy adjustment of the setting.

Figure 5:
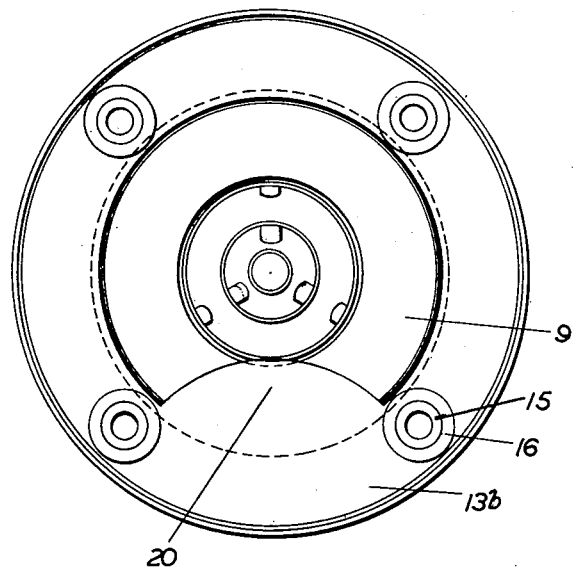
Figure 6:
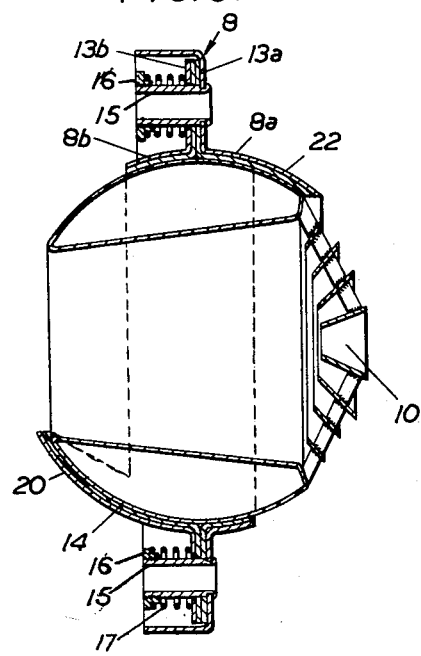
Fig. 6 is a view in section on the line VI—VI of Fig. 4.

In the second embodiment of the invention illustrated in Figs. 4 to 6, the inner flow surface of the ball 9 tapers rearwardly to the cutaway pole. By turning the ball 9 through 90° it may be possible completely to cut off the air delivery depending on the size of said cut away pole. In this second embodiment as shown, the cutaway pole provides an opening sufficiently large to leave small through air passages between the periphery of said opening and the peripheries of the outer spherical parts 8a and 8b. These passages are shrouded by an extension 20 on the rear outer spherical part or socket 8b to enable complete cut-off of the air delivery. The air delivery is cut-off when the central cone 11 coincides with a cut away portion 21 in an extension 22 on the front outer spherical part or socket 8a.

Figure 7:
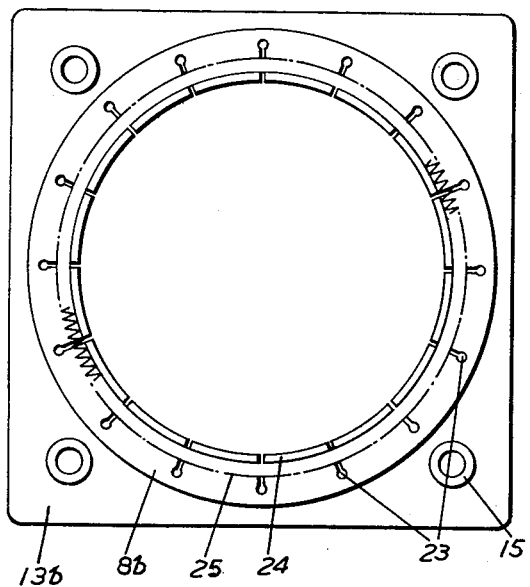
Fig. 7 is a rear elevation of a third directionally adjustable ventilation device or louvre in accordance with the invention.

In the third embodiment illustrated in Fig. 7 and which is similar in construction to the second embodiment, the parts 8a, 8b are rigidly connected together without the use of the springs 17. However, the rear socket component 8b is provided with a series of through slots 23 around its inner periphery disposed upon great circles which pass through a common apex, and a peripheral flange 24. A resilient compressive device 25 is located around the periphery within said flange to urge the slotted portions of the part 8b towards the ball 9 and thereby substantially lock same in place.

The resilient device 25 may be a coil spring connected end-to-end in the form of a ring or it may be a resilient metal strip which tends to contract, for example a split-ring.

It will be noted that while the felt lining 14 prevents leakage of air between the outer and inner parts 8 and 9 at their spherical portions and between the flanges 13a and 13b it also constitutes the sole engaging medium of the outer part 8 with respect to the inner part 9 and therefore any wear of the felt, or its expansion and contraction, due to climatic conditions, pressure due to altitude, or contraction due to age, will be compensated for by the means resiliently urging the components 8a and 8b toward each other.

We claim:

1. In a directionally adjustable ventilating device, the combination of an outer part comprising two opposed, spaced apart, complementary segmental spherical components providing a spherical socket, outwardly directed flanges extending from the adjacent peripheral edges of said components and disposed in spaced confronting relation one to the other, and felt lining in said spherical socket; an inner hollow spherical part, in said socket of said outer part, having a through aperture the surrounding wall of which defines an air-directing passage, said inner hollow spherical part engaging said felt lining as the sole contact of said inner part with respect to said outer part, for universal movement of said inner part with respect to said outer part; and, means resiliently urging at least a portion of at least one of said components of said outer part toward said inner spherical part, compressing said felt lining into intimate contact with the latter to compensate for wear of the felt lining and to yieldably hold the inner and outer parts in positions to which they are relatively adjusted.

2. In a directionally adjustable ventilating device, the combination of claim 1 in which said means is carried by said flanges and resiliently urges both said components of said outer part toward each other for compressing said felt as and for the purpose specified.

3. In a directionally adjustable ventilating device, the combination of claim 2 in which said felt lining is in two parts, one part for each of said components of said outer part, disposed in said spherical socket and having an extending portion disposed between said flanges, said extending portions in engagement with one another and with the flanges of their respective components, whereby said means also yieldably compresses said extending portions of the felt between said flanges.

4. In a directionally adjustable ventilating device, the combination of claim 1 in which one of said components is formed with a series of slots disposed on great circles which pass through a common apex located on a central axis normal to the planes of said flanges and said means comprises a compressive device mounted about the slotted region of said component.

References Cited in the file of this patent
UNITED STATES PATENTS

| | | |
|---|---|---|
| 1,186,428 | Newman | June 6, 1916 |
| 1,401,075 | Hartwig | Dec. 20, 1921 |
| 1,569,667 | Neilson | Jan. 12, 1926 |
| 1,598,482 | Lance et al. | Aug. 31, 1926 |
| 1,886,313 | Stewart | Nov. 1, 1932 |
| 2,056,757 | Adamcikas | Oct. 6, 1936 |
| 2,601,998 | Murray | July 1, 1952 |

FOREIGN PATENTS

| | | |
|---|---|---|
| 36,333 | Netherlands | Sept. 16, 1935 |
| 52,128 | Netherlands | Mar. 16, 1942 |
| 465,740 | Great Britain | May 13, 1937 |
| 520,452 | Great Britain | Apr. 24, 1940 |
| 571,761 | Great Britain | Sept. 7, 1945 |
| 576,859 | Great Britain | Apr. 24, 1946 |
| 596,863 | Great Britain | Jan. 13, 1948 |